Aug. 29, 1961 T. O. RUEB 2,997,864
UNIVERSAL JOINT
Filed June 13, 1960
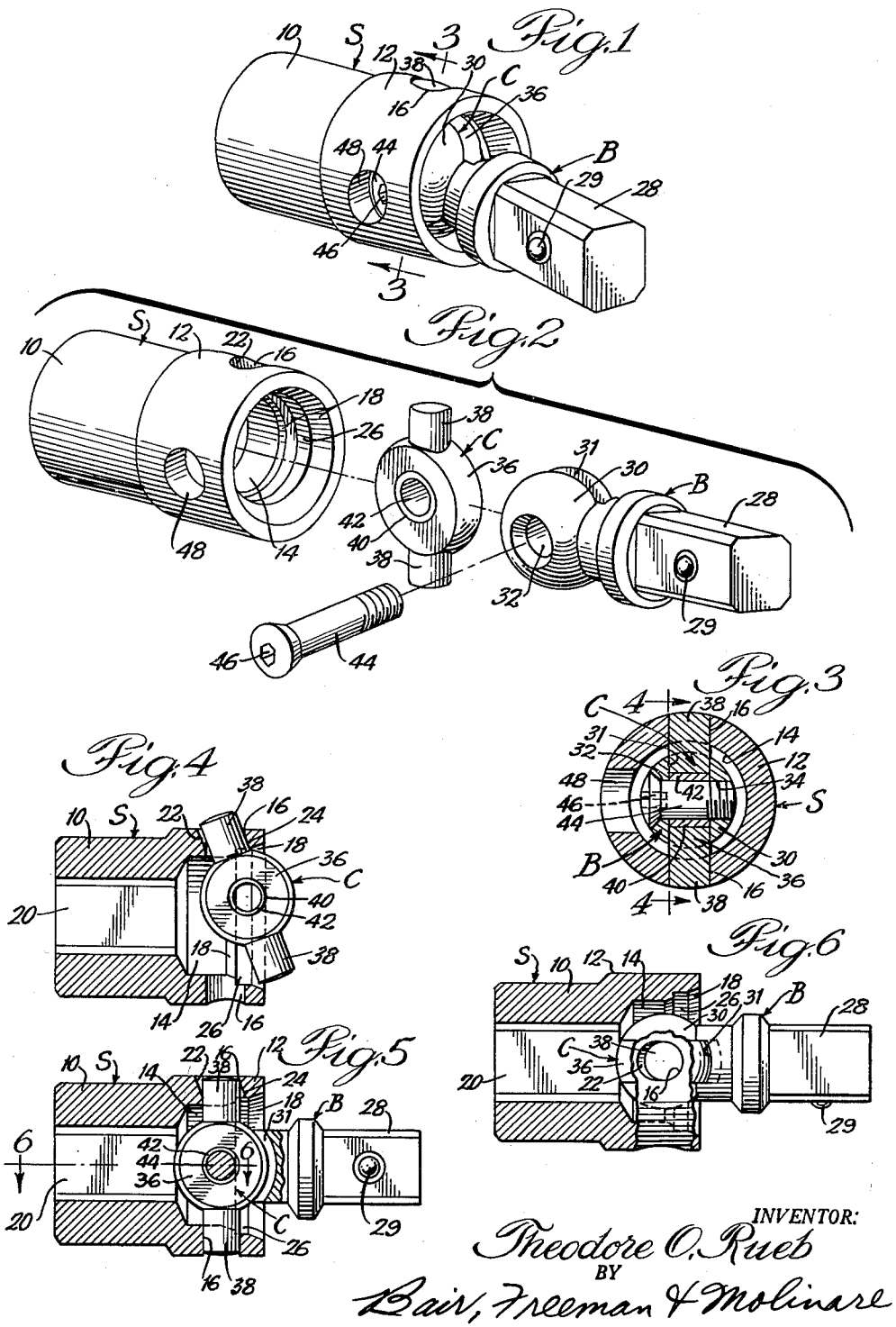
INVENTOR:
Theodore O. Rueb
BY
Bair, Freeman & Molinare
ATTORNEYS.

2,997,864
UNIVERSAL JOINT
Theodore Otto Rueb, Chicago, Ill., assignor, by mesne assignments, to The Sherman Klove Company, Chicago, Ill., a corporation of Maryland
Filed June 13, 1960, Ser. No. 35,481
5 Claims. (Cl. 64—17)

This invention relates to a universal joint, useful in connection with socket wrenches, power transmission shafts, or the like.

One object of the invention is to provide a comparatively simple yet smooth-acting universal joint, having the desirable characteristic of cross-pivot axes in the same plane and, at the same time, providing a connecting member between a socket member and ball member, which is of rugged construction compatible with the ruggedness of the socket member and the ball member themselves, thus eliminating the weak link in most universal joints of crossing-axis character, to wit, the connecting member itself.

Another object is to provide a connecting member which has a disc-like body pivotally received in a bifurcated ball of a ball member, and having integral oppositely-extending pivot studs for reception in pivot stud-receiving bores of a socket member.

A further object is to provide at least one of the pivot stud-receiving bores of the socket member with one or more relief pockets, to permit the entry of a stud therein during assembly of the connecting member to the socket member and thereafter permit swinging of the other stud into position, thereby making possible the use of a solid socket member instead of one that is formed in two parts to fit around the connecting member and which two parts therefore would have to be connected together.

Still a further object is to provide the ball-receiving bore of the socket member with a cone shaped entrance section and a counterbore to further facilitate assembly of the connecting member relative thereto.

With these and other objects in view, my invention consists in the construction, arrangement and combination of the various parts of my universal joint, whereby the objects above contemplated are attained, as hereinafter more fully set forth, pointed out in my claims, and illustrated in detail on the accompanying drawing therein:

FIG. 1 is a perspective view of a universal joint embodying my invention;

FIG. 2 is an exploded perspective view thereof;

FIG. 3 is a vertical cross-sectional view on the line 3—3 of FIG. 1, taken crosswise of the axis of rotation of the universal joint;

FIG. 4 is a vertical sectional view as taken on the line 4—4 of FIG. 3, longitudinally of the axis and showing one step in the assembly of a connecting member in relation to a socket member;

FIG. 5 is a similar sectional view, showing the completely assembled universal joint; and FIG. 6 is a plan view of FIG. 5, with part of the socket member shown in section on the line 6—6 of FIG. 5.

On the accompanying drawing, I have used the reference character B to indicate in general a ball member, C a connecting member, and S a socket member of my universal joint. The socket member S comprises a shank receiving sleeve 10 and a head 12. The head 12 has therein a ball-receiving socket 14, and crosswise of the socket, opposite pivot stud-receiving bores 16. The bore 14 has a cone-shaped entrance section 18, and a counterbore 26, the purpose of which will hereinafter appear. The sleeve 10 has a shank receiving bore 20 for connection with a wrench element (or a shaft when the universal joint is used to connect two shafts together).

At least one of the pivot stud-receiving bores 16 is provided with an outer relief pocket 22 and an inner relief pocket 24. The pockets are formed by skewing a milling cutter the diameter of the bore 16 in the bore in an obvious manner, the purpose of which will hereinafter appear.

The ball member B comprises a shank 28 and a bifurcated ball 30, the slot in the ball being indicated at 31. The ball 30 has a countersunk hole 32 in one arm thereof, and a threaded hole 34 in the other arm thereof. The shank 28 is provided with the usual detent ball 29 when the universal joint is used in a wrench set, or the shank 28 may be modified to connect with a shaft when the universal joint is used in conjunction with a power shaft or the like.

The connecting member C comprises a disc-like body 36 and a pair of integral pivot studs 38 extending oppositely therefrom. The member C may be turned from bar stock of a thickness and width of the disc-like body 36, the body and pivot studs being integral. The body 36 is provided with a through hole 40 which is lined with a bushing 42.

My universal joint includes a fourth member, pivot screw 44, which is provided with a wrench socket 46. The head 12 of the socket member S has a pivot screw clearance hole 48 therein to permit entrance of the pivot screw 44 to its assembled position, as evident in FIG. 3.

The assembly of my universal joint is depicted in FIG. 4, the connecting member C being assembled to the socket member S. First the upper stud 38 of the member C is inserted into the bore 16 having the relief pockets 22 and 24 as shown, and it will be obvious that the lower stud 38 may then be swung toward the left into alignment with the lower bore 16, and then slid downward to center with respect to the socket member as shown in FIG. 5. Thereafter the bifurcated ball 30 is inserted into the ball receiving bore 14 of the socket member S and straddles the body 36 of the connecting member C, whereupon the pivot screw 44 may be inserted through the clearance hole 48 and threaded into position with respect to the threaded hole 34 as shown in FIG. 3. The complete universal joint is now assembled and ready for operation.

From the foregoing specifications, it will be obvious that I have provided the type of universal joint that has crossed pivots in the same plane for smoothness of operation, yet I have provided a relatively rugged connecting member C in which the crossing of one axis (38) relative to the other (44) is not structurally weakened, but rather, by the combination of disc-like body 36 to receive the pivot 44, and the studs 38 integrally extending from the body, a rugged connecting member is provided. At the same time, the problem of assembling such a member has been solved by the provision of relief pockets 22 and 24 in one of the bores 16. Ample clearance is provided for shifting the connecting member during assembly with respect to the socket member by means of the cone-shaped entrance portion 18, and still further clearance may be provided by the counterbore 26.

Some changes may be made in the construction and arrangement of the parts of my universal joint without departing from the real spirit and purpose of my invention, and it is my intention to cover by my claims any equivalent steps which may reasonably be included within their scope.

I claim as my invention:

1. In a universal joint, a socket member having a ball-receiving bore in one end thereof opposite pivot stud-receiving bores crosswise of and intersecting the axis of said ball-receiving bore, a ball member having a bifurcated ball head, and a connecting member comprising a body pivoted in said bifurcated ball head and having integral oppositely extending pivot studs located in said pivot stud-receiving bores of said socket member, one of said pivot stud-receiving bores having relief pockets to permit out-of-alignment entry of one of said pivot studs therein during assembly of said connecting member to said socket member, subsequent swinging movement of the other pivot stud into said ball-receiving bore and thereafter lateral movement thereof longitudinally of the other of said pivot studs for its reception in the other of said pivot stud-receiving bores.

2. In a universal joint, a socket member having a ball-receiving bore in one end thereof and opposite pivot stud-receiving bores crosswise of said bore, a ball member having a bifurcated ball head, and a connecting member pivoted in said ball head and having oppositely extending pivot studs located in said pivot stud-receiving bores of said socket member, said pivot stud-receiving bores having outer and inner relief pockets to permit entry of one of said pivot studs therein during assembly of said connecting member to said socket member and subsequent swinging movement of the other pivot stud into said ball-receiving bore and thereafter lateral movement thereof into the other of said pivot stud-receiving bores.

3. A universal joint comprising a socket member having a ball-receiving bore in one end thereof opposite pivot stud-receiving bores crosswise of the axis of said ball-receiving bore, a ball member having a bifurcated ball head, and a connecting member comprising a disc-like body in said bifurcated ball head and having oppositely extending pivot studs located in said pivot stud-receiving bores of said socket member, a pivot screw for pivoting said connecting member in said ball head, said pivot stud-receiving bores having relief pockets to permit entry of one of said pivot studs therein during assembly of said connecting member to said socket member and having a cone-shaped entrance section to facilitate assembly of said connecting member to said socket member and said socket member having a pivot screw clearance hole for said pivot screw.

4. A universal joint comprising a socket member having a ball-receiving bore in one end thereof opposite pivot stud-receiving bores crosswise of and intersecting the axis of said ball-receiving bore, a ball member having a bifurcated ball head, and a connecting member comprising a body pivoted in said bifurcated ball head and having oppositely extending pivot studs located in said pivot stud-receiving bores of said socket member, said pivot stud-receiving bores having relief pockets to permit entry of one of said pivot studs therein during assembly of said connecting member to said socket member and subsequent swinging movement of the other pivot stud into said ball-receiving bore and thereafter lateral movement thereof to enter the other of said pivot stud-receiving openings, said ball-receiving bore having a cone-shaped entrance section to facilitate assembly of said connecting member with respect to said socket member.

5. A universal joint comprising a socket member having a ball-receiving bore in one end thereof opposite pivot stud-receiving bores crosswise of and intersecting the axis of said ball-receiving bore, a ball member having a bifurcated ball head, and a connecting member comprising a body pivoted in said bifurcated ball head and having oppositely extending pivot studs located in said pivot stud-receiving bores of said socket member, said pivot stud-receiving bores having relief pockets to permit entry of one of said pivot studs therein during assembly of said connecting member to said socket member and subsequent swinging movement of the other pivot stud into said ball-receiving bore and thereafter lateral movement thereof to enter the other of said pivot stud-receiving openings, said ball-receiving bore having a cone-shaped entrance section to facilitate assembly of said connecting member in said socket member.

References Cited in the file of this patent

UNITED STATES PATENTS

| | | |
|---|---|---|
| 791,087 | Deutsch | May 30, 1905 |
| 1,190,425 | Knox | July 11, 1916 |
| 1,253,919 | Williams | Jan. 15, 1918 |

FOREIGN PATENTS

| | | |
|---|---|---|
| 858,884 | France | Dec. 5, 1940 |